United States Patent
Kim et al.

(10) Patent No.: US 10,315,577 B2
(45) Date of Patent: Jun. 11, 2019

(54) SIDE MIRROR FOR VEHICLE

(71) Applicant: BULLSONE CO., LTD., Seoul (KR)

(72) Inventors: Jin-Gu Kim, Seoul (KR); Sung-Koo Lee, Incheon (KR); Jin-Wook Baek, Gyeonggi-do (KR); Gang Lee, Incheon (KR); Ho-Cheol Lee, Sejong (KR)

(73) Assignee: BULLSONE CO., LTD, Seoul (KR)

( * ) Notice: Subject to any disclaimer, the term of this patent is extended or adjusted under 35 U.S.C. 154(b) by 104 days.

(21) Appl. No.: 15/123,482

(22) PCT Filed: Mar. 24, 2014

(86) PCT No.: PCT/KR2014/002459
§ 371 (c)(1),
(2) Date: Sep. 2, 2016

(87) PCT Pub. No.: WO2015/133673
PCT Pub. Date: Sep. 11, 2015

(65) Prior Publication Data
US 2017/0072858 A1     Mar. 16, 2017

(30) Foreign Application Priority Data

Mar. 4, 2014     (KR) ........................ 10-2014-0025692

(51) Int. Cl.
*B60R 1/08*     (2006.01)
*B60R 1/06*     (2006.01)
*B60R 1/02*     (2006.01)

(52) U.S. Cl.
CPC .............. *B60R 1/082* (2013.01); *B60R 1/025* (2013.01); *B60R 1/06* (2013.01); *B60R 1/081* (2013.01)

(58) Field of Classification Search
CPC ........... B60R 1/082; B60R 1/025; B60R 1/06; B60R 1/081
(Continued)

(56) References Cited

U.S. PATENT DOCUMENTS

2010/0246040 A1     9/2010    Lee

FOREIGN PATENT DOCUMENTS

| CN | 2324011 | 6/1999 |
|---|---|---|
| CN | 102007016 A | 4/2011 |

(Continued)

OTHER PUBLICATIONS

Taiwan Office Action for PCT/KR2014/002459, dated Sep. 5, 2016.
International Search Report on PCT/KR2014/002459, dated Dec. 3, 2014.

*Primary Examiner* — Wen Huang
(74) *Attorney, Agent, or Firm* — Endurance Law Group PLC

(57) ABSTRACT

The present invention relates to a side mirror for a vehicle, the side mirror being provided on a vehicle for facilitating the checking of road situations on the left, right, and rear sides. The side mirror for a vehicle comprises a mirror housing which is mounted on the exterior of the vehicle, and a mirror part which is supported by the mirror housing, and is divided into multiple mirror areas which are in aspherical form respectively across the horizontal direction from the internal side, which is close to the vehicle, to the external side, which is far from the vehicle. In the mirror part, the respective optical powers of the mirror areas gradually increase from the internal side to the external side so as to have the same optical power at the borders of the mirror areas, and the optical power rate for at least one of the mirror areas is constant.

1 Claim, 4 Drawing Sheets

(58) Field of Classification Search
USPC .......................................................... 359/866
See application file for complete search history.

(56) References Cited

FOREIGN PATENT DOCUMENTS

| | | |
|---|---|---|
| CN | 203172791 U | 9/2013 |
| JP | 2006088954 | 4/2006 |
| KR | 200167525 | 11/1999 |
| KR | 200288548 | 8/2002 |
| KR | 200322014 | 7/2003 |
| KR | 100867439 | 11/2008 |
| KR | 101000519 B1 | 12/2010 |
| KR | 101046436 | 6/2011 |
| KR | 20130024502 A | 3/2013 |
| KR | 1020130024502 | 3/2013 |
| WO | 2011159058 A2 | 12/2011 |

SIDE MIRROR FOR VEHICLE

TECHNICAL FIELD

The present invention relates to a side mirror for a vehicle, which is provided on a vehicle so that a driver can easily check road situations on the left, right, and rear sides.

BACKGROUND ART

In general, a vehicle has mirrors mounted on the outsides of left/right front doors, the front left/right points of a bonnet, and the inside of a vehicle so that a driver can easily check road situations on the left, right, and rear sides. The mirrors are referred to as room mirrors and side mirrors, depending on the mounting locations thereof. That is, the mirrors located at the outsides of left/right front doors or front left/right points of a bonnet in the vehicle are referred to as the side mirrors.

A driver may recognize driving directions or speeds of other vehicles moving behind through the side mirrors while watching the road ahead on the left and right sides. Therefore, the driver may keep a safety distance from vehicles ahead or behind, and may also safely pass other vehicle moving behind, or change traffic lanes without interfering with the driving of the other vehicles.

Basically, the side mirrors include plane mirrors which are in a plane shape and thus easily manufactured. However, there has been an increasing demand for side mirrors which include convex mirrors in a convex shape so as to allow a vehicle driver to ensure a wider viewing angle, thereby widening the driver's field of view. Such convex mirrors have a wider field of view, compared to the plane mirrors, but have problems in that a driver's judgement may be impaired since objects look smaller due to a high reduction magnification, and an image may be distorted due to spherical aberration.

To solve the problems of the plane mirrors and the convex mirrors, an assistant mirror may also be further mounted on the vehicle. However, since an image is severely changed through a border area for installation of the assistant mirror, the assistant mirror has a problem in that it does not rather provide a sense of rear vision. Therefore, two areas through which a rear object is viewed at a fixed size need to be expressed on one side mirror while minimizing optical distortion.

By way of an example, Korean Registered Utility Model Publication No. 20-0288548 discloses a side mirror which includes an area directed toward a vehicle body and formed in a plane shape and an outside area formed as a plane of curvature in a convex shape. Korean Registered Utility Model Publication No. 20-0322014 discloses a side mirror which includes a plane mirror provided adjacent to a vehicle body and a convex mirror provided relatively far from the vehicle body.

However, such techniques also have problems in that it is difficult to expect a wider field of vision since the expansion of vision depends only on the curvature of the convex mirror far from the vehicle body, and the convex mirror provides an inaccurate sense of distance to an object, compared to the plane mirror, since the convex mirror has a characteristic in which an object looks smaller and looks far away from the center to the edge thereof.

DISCLOSURE

Technical Problem

It is an aspect of the present invention to provide a side mirror for a vehicle, which is capable of eliminating blind spots which a driver cannot see while driving the vehicle, and also allowing the driver to easily predict a distance from an object due to a uniform sense of perspective through a mirror area having a constant optical power rate.

Technical Solution

In order to achieve the above objects, a side mirror for a vehicle according to the present invention includes a mirror housing mounted on an exterior of the vehicle, and a mirror part supported by the mirror housing and divided into a plurality of mirror areas with an aspherical shape in a horizontal direction from an internal side to an external side thereof. Here, the internal side is close to the vehicle, and the external side is far from the vehicle. The mirror part is formed so that the mirror areas have the same optical power at borders thereof as the optical power of each of the mirror areas gradually increases from the internal side to the external side, and at least one of the mirror areas has a constant optical power rate.

Advantageous Effects

The side mirror for a vehicle according to the present invention can be useful in allowing a driver to easily predict a distance from an object due to a uniform sense of perspective through a mirror area having a constant optical power rate while the driver drives a vehicle. Also, the side mirror for a vehicle according to the present invention can be useful in allowing the driver to see objects at short, middle and long distances with a clear and close sense of distance at the same time, widening a vision through the mirror area positioned at the external side so as to eliminate blind spots, and also minimizing image distortion and astigmatism.

MODE FOR INVENTION

Figure 1:
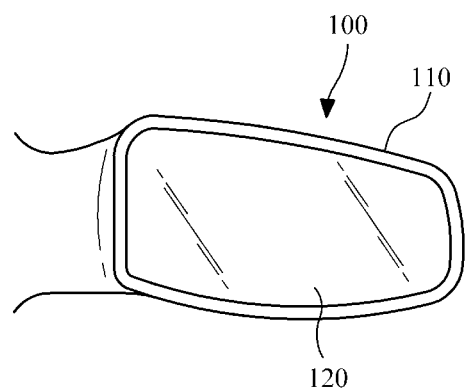
FIG. 1 is a front view of a side mirror for a vehicle according to one exemplary embodiment of the present invention.

Hereinafter, the present invention will be described in detail with reference to the accompanying drawings. In the drawings, like numbers refer to like elements, and repeated descriptions, and detailed descriptions of well-known functions or constructions will be omitted since they would unnecessarily obscure the subject matter of the present invention. Exemplary embodiments of the present invention are provided to fully describe the present invention to persons having ordinary skill in the art. Thus, the shapes and dimensions of elements in the drawings may be exaggerated for the sake of convenience of clearer description.

Figure 2:
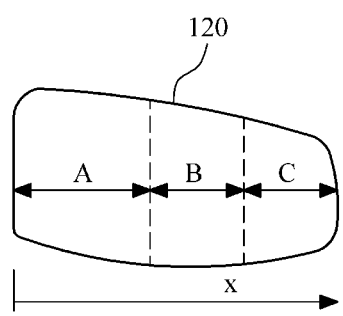
FIG. 2 is a front view showing a mirror part as shown in FIG. 1.

FIG. 1 is a front view of a side mirror for a vehicle according to one exemplary embodiment of the present invention. FIG. 2 is a front view showing a mirror part as shown in FIG. 1.

Referring to FIGS. 1 and 2, a side mirror 100 for a vehicle includes a mirror housing 110 and a mirror part 120. The mirror housing 110 is mounted on an exterior of the vehicle. The mirror housing 110 may be mounted to be folded or unfolded on the exterior of the vehicle. The mirror housing 110 serves to protect the mirror part 120 from external impacts and support the mirror part 120.

The mirror part 120 is supported by the mirror housing 110. The mirror housing 110 may be wrapped around the mirror part 120 so that a reflection surface is exposed to the outside. The mirror part 120 is divided into a plurality of mirror areas with an aspherical shape in a horizontal direction from an internal side to an external side thereof. Here, the internal side is close to the vehicle, and the external side is far from the vehicle.

The aspherical shape refers to a shape similar to a loose normal distribution curve. In this case, the shape is neither spherical nor plane. An aspherical plane has a shape which becomes flat as a curvature decreases from a central part to a peripheral part thereof, or a shape in which a curvature increases from flat central part to a peripheral part thereof. That is, an aspherical lens or mirror has a curvature varying from a central part to a peripheral part thereof, and also has a varying optical power. A level of variation in such an optical power is referred to as an optical power rate, and may be expressed as an eccentricity of an aspherical curve.

The mirror part 120 is formed so that at least one of the mirror areas has a constant optical power rate. Therefore, a driver may readily expect distances from objects due to a uniform sense of perspective through the mirror areas having a constant optical power rate.

The mirror part 120 is formed so that the mirror areas have the same optical power at the borders thereof as the optical power of each of the mirror areas gradually increases from the internal side to the external side thereof. The optical power refers to a level of refraction of light by the mirror part 120, and is expressed in diopters. The optical power may be calculated as the reciprocal of an average radius of curvature.

Since the mirror part 120 has an optical power gradually increasing from the internal side to the external side thereof, a driver may be allowed to see objects at short, middle and long distances with a clear and close sense of distance at the same time without distorting all the objects. Also, a vision may be widened through the mirror area positioned at the external side so as to eliminate blind spots, and image distortion and astigmatism may be minimized as well. Also, the mirror part 120 may prevent images from jumping around the borders of the mirror areas since the mirror areas have the same optical power at the borders thereof.

For example, as shown in FIG. 2, the mirror areas may include three areas divided as an inside mirror area A, a central mirror area B, and an outside mirror area C. The inside mirror area A corresponds to an area closest to a vehicle, and the outside mirror area C corresponds to an area farthest from the vehicle. The central mirror area B corresponds to an area between the inside mirror area A and the outside mirror area C.

The ratio of widths of the inside mirror area A, the central mirror area B, and the outside mirror area C in an X-axis direction may be 4:3:3, as viewed in a horizontal direction. That is, the inside mirror area A may have the highest width, and the central mirror area B and the outside mirror area C may have the same width. When the inside mirror area A has a wide surface area, it is advantageous to remove image distortion and resolve an inaccurate sense of distance. The inside mirror area A may be configured to occupy a half or more of the entire area of the mirror part 120. Also, the surface area of each of the inside mirror area A, the central mirror area B and the outside mirror area C may also be set differently, depending on the shape of the mirror part 120.

Figure 3:
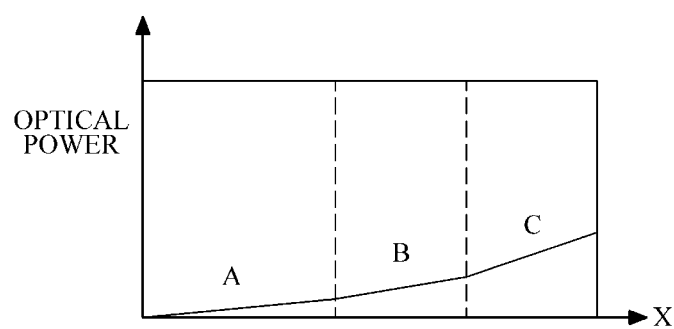
FIG. 3 is a graph illustrating an optical power of the mirror part of FIG. 2 in a horizontal direction.

As shown in FIG. 3, the inside mirror area A may have the same optical power as the central mirror area B at the border therebetween as the optical power increases in a horizontal direction (i.e., an X-axis direction) from an inside edge to the border with the central mirror area B. In the inside mirror area A, the optical power may gradually increase. Therefore, an image jumping phenomenon around the borders of the inside mirror area A and the central mirror area B may be prevented. The central mirror area B may have the same optical power as the outside mirror area C at the border therebetween as the optical power increases in an X-axis direction from the border with the inside mirror area A to the border with the outside mirror area C. In the central mirror area B, the optical power may gradually increase. Therefore, an image jumping phenomenon around the borders of the central mirror area B and the outside mirror area C may be prevented.

Also, in the outside mirror area C, the optical power may increase in an X-axis direction from the border with the central mirror area B to an outside edge thereof. In the outside mirror area C, the optical power may gradually increase.

Therefore, an object at a short distance may be seen through the inside mirror area A without distorting an image of the object. An object at a middle distance may be seen through the central mirror area B without distorting an image of the object. Also, an object at a long distance may be seen through the outside mirror area C without distorting an image of the object. Therefore, the mirror part 120 may allow a driver to see the objects at the short, middle and long distances with a clear and close sense of distance at the same time without distorting all the objects.

Figure 4:
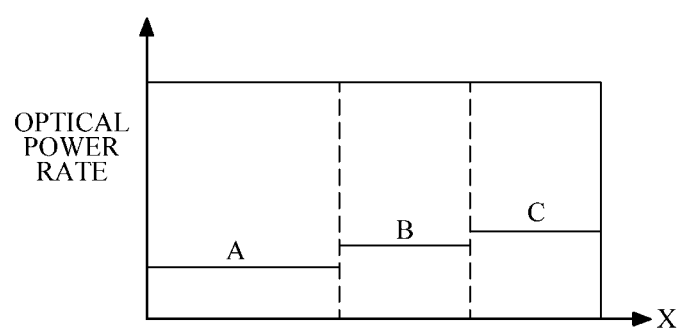
FIG. 4 is a graph illustrating an optical power rate in a horizontal direction for of the mirror part as shown in FIG. 2.

As shown in FIG. 4, each of the inside mirror area A, the central mirror area B and the outside mirror area C may have a constant optical power rate. A driver may readily expect distances from the objects due to a uniform sense of perspective through the inside mirror area A, the central mirror area B and the outside mirror area C. By way of an example, the optical power rate of the outside mirror area C may be higher than that of the central mirror area B, and the optical power rate of the central mirror area B may be higher than that of the inside mirror area A.

Although not shown, by way of another example, the inside mirror area A, the central mirror area B and the outside mirror area C may have the same optical power rate. That is, the optical power rate in a horizontal direction may be maintained constant through the entire area of the mirror part 120. By way of still another example, as if the optical power rate of the inside mirror area A is higher than that of the central mirror area B or the outside mirror area C, or the optical power rate of the central mirror area B is higher than that of the outside mirror area C, the inside mirror area A, the central mirror area B and the outside mirror area C may have different optical power rates.

The present invention has been described in detail with reference to the accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention claimed is:
1. A side mirror for a vehicle comprising:
a mirror housing mounted on an exterior of the vehicle; and
a mirror part supported by the mirror housing and divided into a plurality of mirror areas with an aspherical shape in a horizontal direction from an internal side to an external side thereof, the internal side being close to the vehicle and the external side being far from the vehicle,
wherein the mirror part is formed so that the mirror areas have same optical power at borders thereof as optical power of each of the mirror areas gradually increases from the internal side to the external side, each of the mirror areas has a constant optical power rate, the mirror areas comprise three areas divided as an inside mirror area and a central mirror area and an outside mirror area, an optical power rate of the outside mirror area is higher than an optical power rate of the central mirror area, and the optical power rate of the central mirror area is higher than an optical power rate of the inside mirror area,
wherein the inside mirror area has the same optical power as the central mirror area at the border therebetween as the optical power gradually increases from an inside edge to the border with the central mirror area,
the central mirror area has the same optical power as the outside mirror area at the border therebetween as the optical power gradually increases from the border with the inside mirror area to the border with the outside mirror area, and
in the outside mirror area, the optical power gradually increases from the border with the central mirror area to an outside edge thereof.

* * * * *